Sept. 25, 1956     R. S. ENABNIT     2,764,018
APPARATUS FOR ANALYZING THE DYNAMIC DEFLECTION OF TIRES
Filed June 10 1954     3 Sheets-Sheet 1

*INVENTOR.*
ROBERT S. ENABNIT
BY
*ATTORNEY*

Sept. 25, 1956     R. S. ENABNIT     2,764,018

APPARATUS FOR ANALYZING THE DYNAMIC DEFLECTION OF TIRES

Filed June 10, 1954     3 Sheets-Sheet 2

INVENTOR.
ROBERT S. ENABNIT

BY

R. L. Miller
ATTORNEY

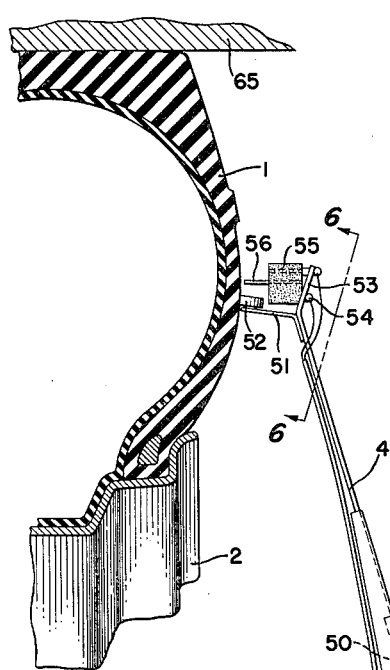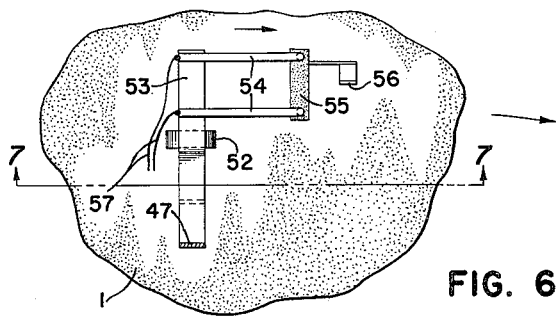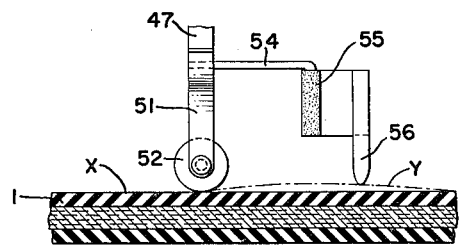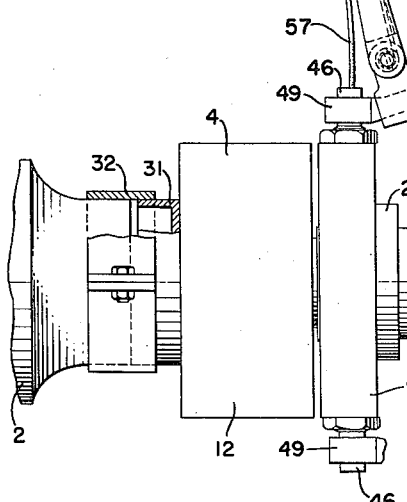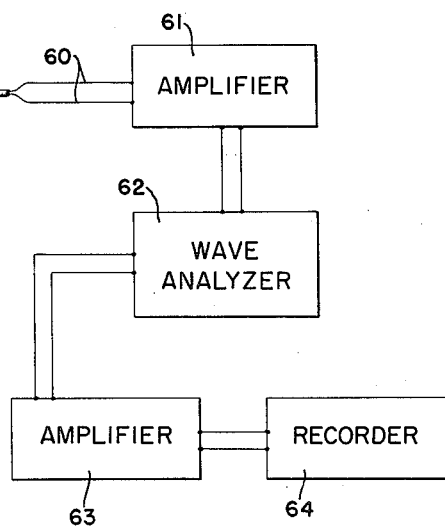

United States Patent Office 2,764,018
Patented Sept. 25, 1956

2,764,018

APPARATUS FOR ANALYZING THE DYNAMIC DEFLECTION OF TIRES

Robert S. Enabnit, Cuyahoga Falls, Ohio, assignor to The Goodyear Tire & Rubber Company, Akron, Ohio, a corporation of Ohio Application June 10, 1954, Serial No. 435,679

7 Claims. (Cl. 73—67)

This invention relates to an apparatus for identifying and locating anomalous conditions in a tire which produce localizing changes in the deflection characteristics of the tire sidewall and give rise to tire thump during rotation.

The problem of identifying tire thump has become increasingly important because the noise level created by vehicles is being reduced to a minimum so that tires having a thump of relatively low magnitude, which in the past were acceptable, are now annoying. Although the apparatus of this invention can be used to detect and locate defects in the tire, such as a torn button, foreign material in the tread design, wobble, eccentricity and the like, the invention is primarily directed to identifying and locating defects which produce one or more pulses lying below the background level and had heretofore been unidentifiable. Thumper tires caused by this type of defect may be differentiated from the bumping or jolting tires on the following basis: bumping tires produce a jolt or an abrupt vertical movement of the tire and wheel which can be picked up electronically as an acceleration above the background level on either the wheel or the frame, enough of the disturbance is air-borne to make identification positive by aural methods, the road rating of bumping tires is almost always "bad plus." Thump produced by pulses of low magnitude cannot be so identified. This is due both to the secondary amplitude of the pulse and the fact that the secondary vibration excited may be different in each case and has a duration of less than one wheel revolution.

In any tire during rotation, a complex displacement pattern is generated and in addition fundamental vibration modes of the tire are excited. A waveform or harmonic analysis on vibration patterns obtained becomes quite complex, and identification of thump cannot be made through this medium. However, regardless of how the frame or car body responds one assumption can be made which holds true in all cases, namely, that for any particular tire there is one position of tire-road contact that produces a condition at the area of contact which is different from any other position of the tire. Based on this fact, the present invention is directed to a method and apparatus which slowly scans the rotating tire and successively compares each increment of the scan with all other increments.

An object of this invention, therefore, is to provide an apparatus for detecting the occurrence of tire thump in a rotating tire and for determining accurately the portion of the tire causing the thump.

Another object is to provide an apparatus for detecting tire thump in a rotating tire by graphically registering the output of a scanning device which measures sidewall displacement at the road contact area of each successive increment of the tire. A further object is to provide an apparatus which is rugged in construction and easily applied to the wheel of a tire for detecting and locating tire thump of very low magnitude by slowly scanning the tire during rotation with a device highly sensitive to minute differences in the rate and magnitude of sidewall deflection of each successive increment of the tire during rotation.

These and other objects and advantages will be apparent from the following description and drawings in which Fig. 1 is a front elevational view of the tire thump detecting and locating apparatus mounted on the wheel of a tire and constructed in accordance with this invention.

Fig. 5 is a sectional view of the apparatus taken along the lines 5—5 of Fig. 1 and also showing diagrammatically the electrical circuit of the apparatus.

Fig. 6 is a sectional view taken along the lines 6—6 of Fig. 5 and showing in plan view the pick-up mechanism of the invention.

Fig. 7 is a sectional view taken along the lines 7—7 of Fig. 6 and showing an elevational view of the pick-up mechanism.

Figure 1:
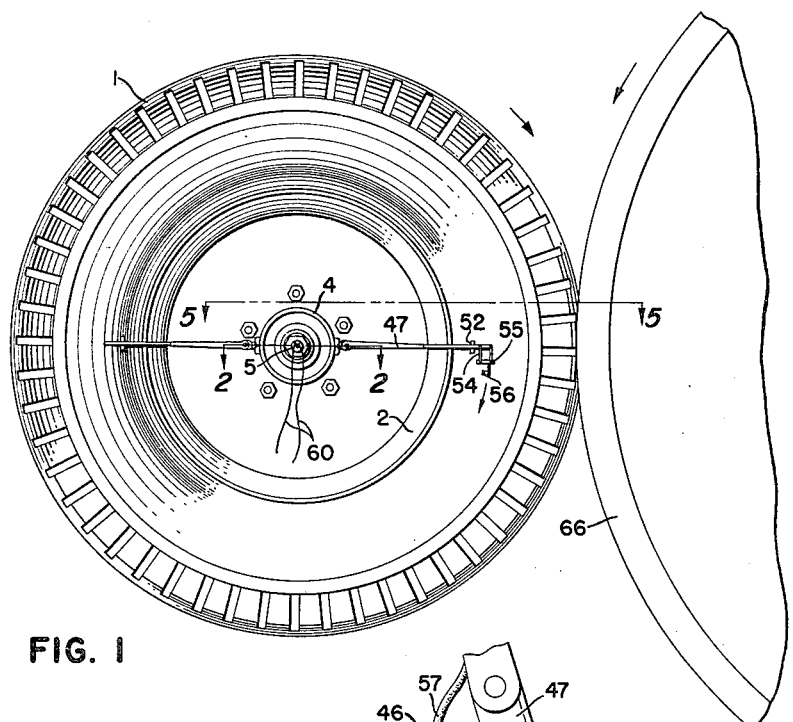
Figure 2:
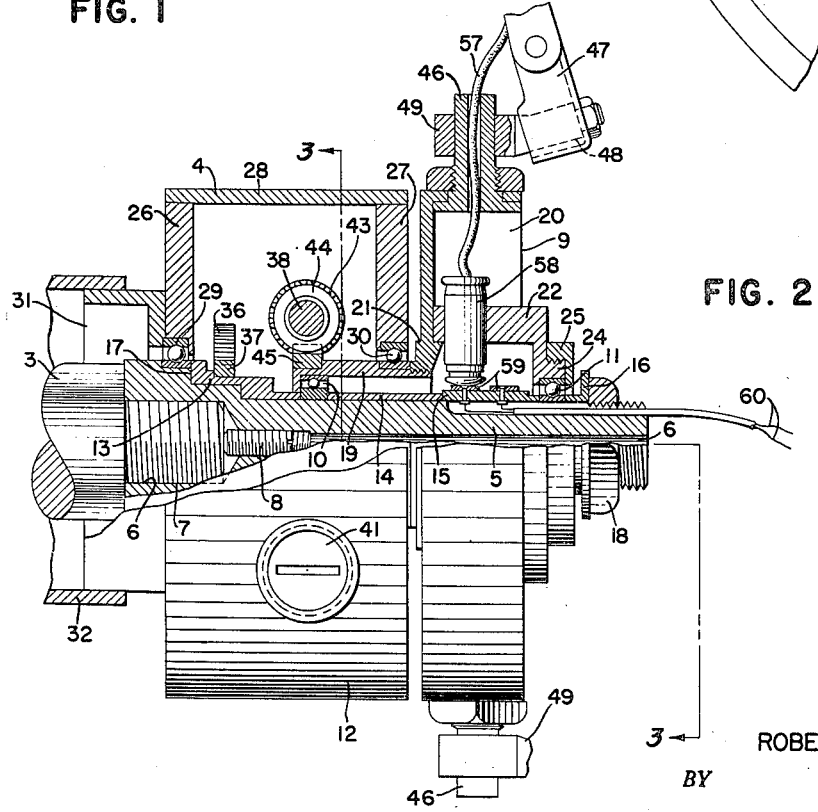
Fig. 2 is a cross sectional view taken along the line 2—2 of Fig. 1.
Figure 3:
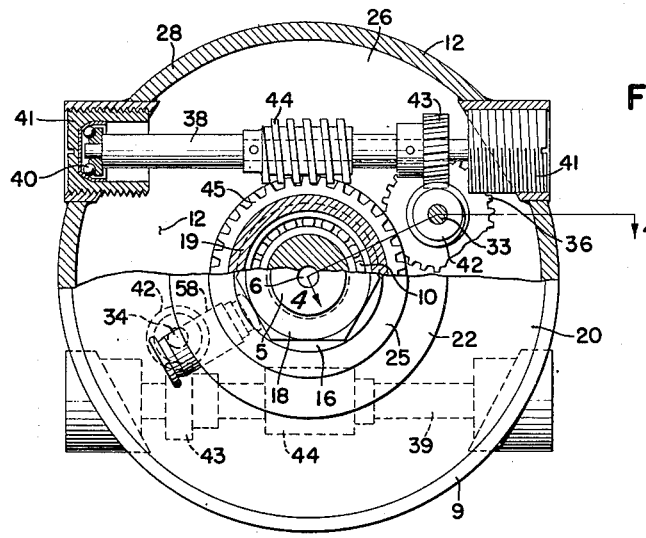
Fig. 3 is a cross sectional view taken along the lines 3—3 of Fig. 2.
Figure 4:
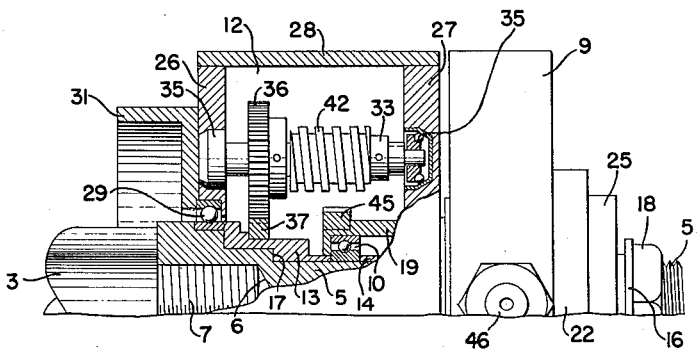
Fig. 4 is a cross sectional view taken along the lines 4—4 of Fig. 3.

Referring to Fig. 1 of the drawings, the inflated tire 1, which is to be tested, is mounted upon a conventional wheel 2, and the wheel and tire assembly mounted on a fixed axle 3. The tire thump detecting and locating assembly of this invention, generally referred to by the numeral 4, is provided with a main shaft 5 having a central bore 6 provided with screw threads 7 at the inner end thereof so that the assembly 4 may be detachably secured to the axle 3 and locked thereon by the screw 8. The scanning carriage assembly 9 is rotatably mounted on ball bearings 10 and 11. The carriage 9 is driven by the wheel 2 through a speed reduction unit 12, hereinafter more fully described, at a constant ratio to the wheel speed approximating but not equal to unity.

The bearings 10 and 11 are spaced along the axle 3 by suitable spacers 13, 14, 15 and 16 and are prevented from moving axially by the shoulders 17 of shaft 5 and the lock nut 18 threadedly secured to the outer end of shaft 5. The scanning carriage assembly 9 is preferably made from a plurality of elements for ease of assembly consisting of a cylindrical member 19 threadedly secured to a ring member 20. The ring member 20 is provided with an annular flange 21 supporting the cylindrical member 22. The cylindrical members 19 and 22 are provided with depending annular flanges 23 and 24 which engage respectively the lateral edge of the bearings 10 and 11. Locking ring 25 is secured to the cylindrical member 22 and prevents the carriage assembly 9 from moving axially.

The speed reduction unit 12 is provided with a housing constructed of a pair of ring members 26 and 27, suitably secured to a cylindrical member 28 and mounted for rotation on the ball bearings 29 and 30 which are respectively locked against axial movement on shaft 5 by the spacer 13 and ring member 20. An annular flange member 31 secured to the ring 27 is detachably secured to the wheel 2 by a band 32.

A pair of pinions 33 and 34 are rotatably supported parallel to shaft 5 by bearings 35 mounted on the members 26 and 27. The pinions 33 and 34 are diametrically disposed for purposes of balance. A spur gear 36 is secured to each pinion 33 and 34 and engages the ring gear 37 fixed to the main shaft 5. A second pair of pinions 38 and 39 are rotatably supported at right angles to shaft 5 by bearings 40 disposed in retaining cups 41 on the cylindrical members 28. Worm gears 42 are secured to each pinion 33 and 34 and engage respectively the gears 43 secured to pinions 38 and 39. Worm gears 44 fixed to pinions 38 and 39 engage the ring gear 45 attached to the member 19 of the carriage assembly.

From the foregoing, it is seen that as the wheel 2 is rotated the speed reduction unit 12 which is attached to the wheel 2 carries the pinions around the main shaft 5. Since the ring gear 37 is fixed to shaft 5, the spur gear 36 is revolved and the remaining gears of the speed reduction unit 12 are actuated so as to rotate the carriage 9 relative to the speed reduction unit 12 and wheel 2. The gear ratios are such that the carriage 9 is rotated approximately two revolutions per minute faster than the wheel 2 when the latter is rotating at 1200 R. P. M. Otherwise stated, the carriage 9 moves approximately 0.6° of arc relative to the wheel 2 per revolution of the wheel 2 so that in approximately 600 revolutions of the wheel 2, the carriage 9 has been moved through 360° of arc relative to the wheel 2.

The ring member 20 is provided with one or more tubular members 46 threaded radially thereto. Scanning arms 47 are bolted to stub shafts 48 integrally formed on the nuts 49 which are fastened to the members 46. The scanning arms are longitudinally extensible and are provided with a coiled spring 50 which biases the arm toward the sidewall of the tire. The outer ends of the arms 47 are provided with a depending projection 51 having a roller 52 which continuously engages the sidewall of the tire. The longitudinal projection 53 is provided with a laterally extending fork 54 made of conductive material connected to a deflection-sensitive, current-producing pick-up 55 having a depending point contact 56.

Many types of commercially available pick-up units may be employed provided the size and weight are not excessive and the pick-up unit is not rendered inoperative by the attendant centripetal force. A Rochelle salt crystal has been found to be very effective since this type of pick-up has high sensitivity, low weight and is not affected by centripetal force.

Lead wires 57 are electrically connected to the fork 54 and extend along the arm 47 through one of the several deflector members 46 to the brushes 58 which are radially attached to the cylinder member 22 of the carriage assembly 9. The brushes 58 engage slip rings 59 which are connected by the leads 60 to the amplifier 61. After amplification the output current of the pick-up 55 is passed to a conventional selective filter or wave analyzer 62 which is set to pass primarily the frequency of the wheel 2 so that the effects of vibration set up in the pick-up 55 and wheel 2 are filtered out. The filtered output current is then reamplified in amplifier 63 and passed to a conventional direct writing recorder 64.

Referring to Fig. 6 of the drawing, the point contact 56 of the pick-up unit 55 is positioned forward and radially outward of the roller 52. The contacting point of the contact 56 may be in the same plane as the contact plane of roller 52, so that the point 56 is dragged along the entire sidewall periphery of the tire. However, it is preferable that the contact 56 be positioned in a plane slightly above the plane of the sidewall. As the tire is pulled under load over a road surface 65 and thereby revolves, or as the tire is revolved by engagement with a driven roll 66, the pick-up 55 travels slowly relative to the tire in the direction shown by the arrow in Fig. 6. The contact 56 engages the sidewall of the tire which is deflected from the plane X into the plane Y, as shown in Fig. 7, when it passes through the area of road contact. During each revolution of the tire the pick-up is moved a predetermined circumferential distance so that on the next succeeding revolution a new segment of the tire is scanned. As the pick-up 55 travels slowly around the tire an impulse is generated corresponding to each tire segment passing through the road contact area and these impulses are continuously recorded after filtering as previously described. When a thump-producing irregularity occurs, the deflection of the sidewall is minutely changed and the difference can be observed by comparison of the rate of change in the magnitude of the pick-up output pulses corresponding to the irregularity with the output at any other time on the complete tire record.

Figure 8:
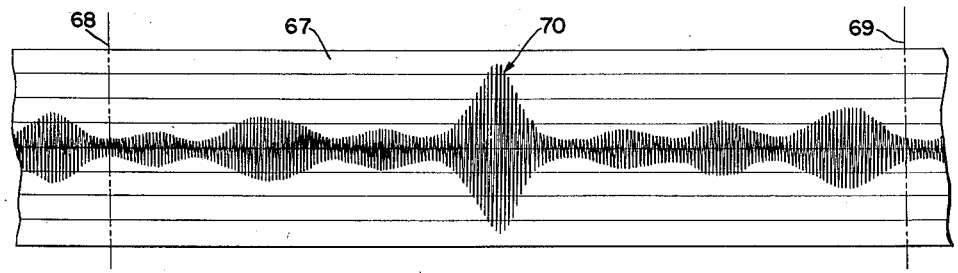
Fig. 8 is a plan view of the graphic record produced by the recorder showing a typical test pattern.

Referring to Fig. 8, one complete scanning cycle is represented on the record 67 by the bars 68 and 69. It is seen that the graph has a rather non-uniform appearance. Some patches of large deflection are due to wheel wobble which tends to cause the scanning arm to ride higher or lower on the sidewall. The graph in Fig. 8 is a typical record for a tire having a defect causing a thump rated as "medium." The effect of any change in the deflection pattern must be analyzed in terms of shape, duration and magnitude. In the portion 70 of the graph, the rate of change in the magnitude is rapid and short in duration relative to any other portion which positively indicates that the tire tested contains a defect causing a "medium" thump.

In order to locate the portion of the tire producing the thump, the position of the scanning pick-up is marked on the tire prior to the test and it is seen that the circumferential distance of the thumping portion relative to the initial mark will be proportional to the distance between bar 68 and portion 70 shown on the record. The most obvious method of locating the thumping portion of the tire is to completely scan the tire sidewall and analyze the record 67. After the thumping portion has been located on the record 67, the wheel 2 is rotated with the pick-up 55 in operable position and the wheel 2 is stopped when the recorder reproduces the portion 70 on the record 67. The pick-up arm will then be located at the portion of the tire containing the thump producing defect. The faulty portion may then be dissected or otherwise analyzed in order that the nature of the defect may be determined.

While certain representative embodiments and details have been shown for the purpose of illustrating the invention, it will be apparent to those skilled in this art that various changes and modifications may be made therein without departing from the spirit or scope of the invention.

I claim:

1. An apparatus for testing tires to determine the magnitude and location of tire thump comprising, in combination, a shaft, a tire to be tested under load rotatably mounted on said shaft, means to rotate said tire, means responsive to deflection for producing electric current variations in response to deflection of the tire at the road-contacting area, means for supporting said deflection responsive means adjacent the sidewall of the tire, means for rotating said supporting means at a constant ratio to the speed of said tire approximating, but not equal to, unity, and means for recording the output of said deflection responsive means.

2. An apparatus for testing tires to determine the magnitude and location of the tire thump comprising, in combination, a fixed shaft, a tire to be tested under load rotatably mounted on said shaft, means to rotate said tire, means responsive to deflections for producing electrical current variations in response to deflection of the tire at the road-contacting area, supporting means mounted on said shaft and supporting said deflection responsive means in contact with the sidewall of the tire, means for rotating said supporting means at a constant ratio to the speed of the tire approximating, but not equal to, unity and means for recording the output of said deflection responsive means.

3. An apparatus for testing tires to determine the magnitude and location of tire thump comprising, in combination, a fixed shaft, a tire to be tested under load rotatably mounted on said shaft, means to rotate said tire, means responsive to deflection for producing electrical current variations in response to deflection of the tire sidewall at the road-contacting area, supporting means mounted on said shaft for supporting said deflection responsive means adjacent to the sidewall of the tire, a speed reduction unit driven by said tire rotating means associated with said supporting means to drive said supporting means at a constant ratio to the speed of the tire approximating, but not equal to, unity and means for recording the output of said deflection responsive means.

4. An apparatus for testing tires to determine the magnitude and location of tire thump comprising, in combination, a fixed shaft, a tire to be tested under load rotatably mounted on said shaft, means to rotate the tire, means responsive to deflection for producing electrical current variations in response to deflection of the tire sidewall at the road-contacting area, supporting means mounted on said shaft and supporting said deflection responsive means adjacent to the sidewall of the tire, a speed reduction unit supported on said shaft for driving said supporting means at a constant ratio to the speed of the tire approximating, but not equal to, unity and means for recording the output of said deflection responsive means.

5. An apparatus for testing tires to determine the magnitude and location of tire thump comprising, in combination, a shaft rotatably supporting the tire to be tested under load, means to rotate the tire, means responsive to deflection for producing electric current variations in response to deflection of the tire sidewall at the road-contacting area, a carriage rotatably mounted on said shaft having at least one arm for supporting said deflection responsive means adjacent the sidewall of the tire, means for rotating said carriage at a constant ratio to the speed of said tire approximating, but not equal to, unity, and means for recording the output of said deflection responsive means.

6. An apparatus for testing tires to determine the magnitude and location of tire thump comprising, in combination, a shaft rotatably supporting the tire to be tested under load, means to rotate the tire, means responsive to deflection for producing electrical current variations in response to deflection of the tire sidewall at the road-contacting area, supporting means mounted concentrically on said shaft having at least one extension for supporting said deflection responsive means adjacent the sidewall of the tire, means contacting the sidewall of the tire and supported on said extension for maintaining the radial outer end of said extension a fixed distance from the sidewall, means for rotating said supporting means at a constant ratio to the speed of said tire approximating, but not equal to, unity, and means for recording the output of said deflection responsive means.

7. Apparatus for testing tires to determine the magnitude and location of tire thump comprising, in combination, means for rotatably supporting the tire to be tested under load, means to rotate said tire, current-producing means responsive to minute deflections engaging a segment of the sidewall of said tire as said segment passes through the road contacting portion of its path of travel, means for moving said current-producing means a minute distance circumferentially relative to said sidewall segment during each revolution of said tire, and means for recording the output of said current producing means.

References Cited in the file of this patent

UNITED STATES PATENTS

| | | |
|---|---|---|
| 2,345,679 | Linse | Apr. 4, 1944 |
| 2,445,731 | Jaycox | July 20, 1948 |
| 2,618,971 | Herzegh | Nov. 25, 1952 |
| 2,695,520 | Karsai | Nov. 30, 1954 |

OTHER REFERENCES

Tire Tread Noise Analyzer by S. Lippmann et al., Electronics, November 1950, pp. 84–87.